United States Patent Office 3,363,739
Patented Jan. 16, 1968

3,363,739
APPARATUS AND METHOD OF SPACING GROUPS OF BOOKS
Henry R. Mebus, Easton, Pa., assignor to T. W. & C. B. Sheridan Company, Easton, Pa., a corporation of New York, a wholly-owned subsidiary of Harris-Intertype Corp., Cleveland, Ohio, a corporation of Delaware
Filed Dec. 30, 1965, Ser. No. 517,683
11 Claims. (Cl. 198—31)

ABSTRACT OF THE DISCLOSURE

The trimmed books are transported in stacks under a stack detector and after a determination is made of the number of books in the stack are directed onto the take-up conveyor in a fanned fashion. The holddown belt serves to maintain the fanned books in position on the take-up conveyor while the take-up conveyor speed is accelerated to space successive groups of books.

This invention relates to an apparatus and method of spacing groups of books. More particularly, this invention relates to an accelerator counter delivery apparatus and method for spacing a series of book groups on a take-up conveyor of a book trimmer assembly.

The general manner of handling untrimmed books, such as, magazines, pamphlets, etc., has been to deliver a steady stream of such books in stacks to a book trimmer to trim the edges of the books flush at a trimming station with subsequent delivery to a take-up conveyor in a fanned manner for manual removal in groups of a desired number, for example, in groups of twenty. The various trimmer machines employed for these operations have utilized several devices for indicating where the first and last book of each desired group is located on the conveyor. Among such devices is a device which includes a kicker device which moves the first or last book of a group sidewisedly out of alignment from the remaining books of the group after trimming so that an easily detectable visual deviation is formed.

Accordingly, it is an object of this invention to provide an apparatus and method for automatically spacing groups of books for removal from a take-up conveyor of a book trimmer assembly.

It is another object of this invention to provide an apparatus and method for accurately providing a predetermined number of books in a series of spaced groups of books on a takeup conveyor of a book trimmer assembly.

It is another object of this invention to provide an apparatus and method for automatically rejecting a stack of books of incorrect number from a book trimmer without affecting delivery of a correct number of books in a series of spaced groups of books to a delivery conveyor of the book trimmer.

It is another object of this invention to provide an apparatus and method for interrupting the operation of a take-up conveyor of a book trimmer assembly while rejecting a stack of books of incorrect number.

It is another object of this invention to provide an apparatus and method which spaces successive groups of books by alternating the speeds of a take-up conveyor relative to the delivery of a stream of books thereon.

Generally, this invention provides an apparatus and method for spacing groups of books after trimming in a book trimmer. After books are trimmed they are transported in a series of trimmed book stacks on a trimmer conveyor under a stack detector which detects the number of books in successively transported book stacks and thereafter, when the desired number of books are in a detected stack, over a deflector assembly unto a take-up conveyor in a fanned or shingled fashion. In addition, the apparatus of the invention includes a counter mechanism which counts successively detected book stacks of the desired number and a transmission which is operably connected to the counter mechanism. The transmission is adapted to drive the take-up conveyor at a normal slow speed and an intermittent higher speed than normal in response to a predetermined count of book stacks so as to effect a spacing between successive groups of books on the take-up conveyor.

Further, the apparatus includes a deflector assembly positioned at the downstream end of the trimmer conveyor which has a pivotal arm means for movement into the path of travel of the transported book stacks on the trimmer conveyor so as to divert an undesired book stack from the take-up conveyor to a chute wherefrom it is directed into a collection hopper. The deflector assembly is operably connected with the stack detector so that as an undesired book stack is detected a switch is activated not only to shut off the take-up conveyor while raising the deflector arm into the path of travel of the undesired book stack but also to deactivate the counter mechanism so that the undesired book stack is not counted.

A holddown belt assembly is also provided above the take-up conveyor adjacent the trimmer conveyor to maintain the fanned fashion of the books thereon during movement of the take-up conveyor belt. The holddown assembly includes an intermediate pulley which is adapted to press the holddown assembly conveyor belt into engagement with the top surface of the last book of a spaced group of books at the front of the book so as to effectively pinch the book between the belts of the holddown assembly and take-up conveyor during the acceleration of the take-up conveyor to maintain the relative positions of the books in the group. The pulley is horizontally adjustable so as to be positioned in the proper timed relationship with the book trimmer to cause engagement of the holddown conveyor belt and front of the last book of each group. In addition, the conveyor pulleys of the holddown assembly are sized and positioned with respect to the intermediate pulley so that the angle formed by the holddown assembly belt and take-up conveyor adjacent the trimmer conveyor can be varied in relation to the length of the books delivered to the take-up conveyor upon movement.

These and other objects and advantages of the invention will become more apparent from the following detailed description and appended claims taken in conjunction with the accompanying drawings in which:

Figure 1:
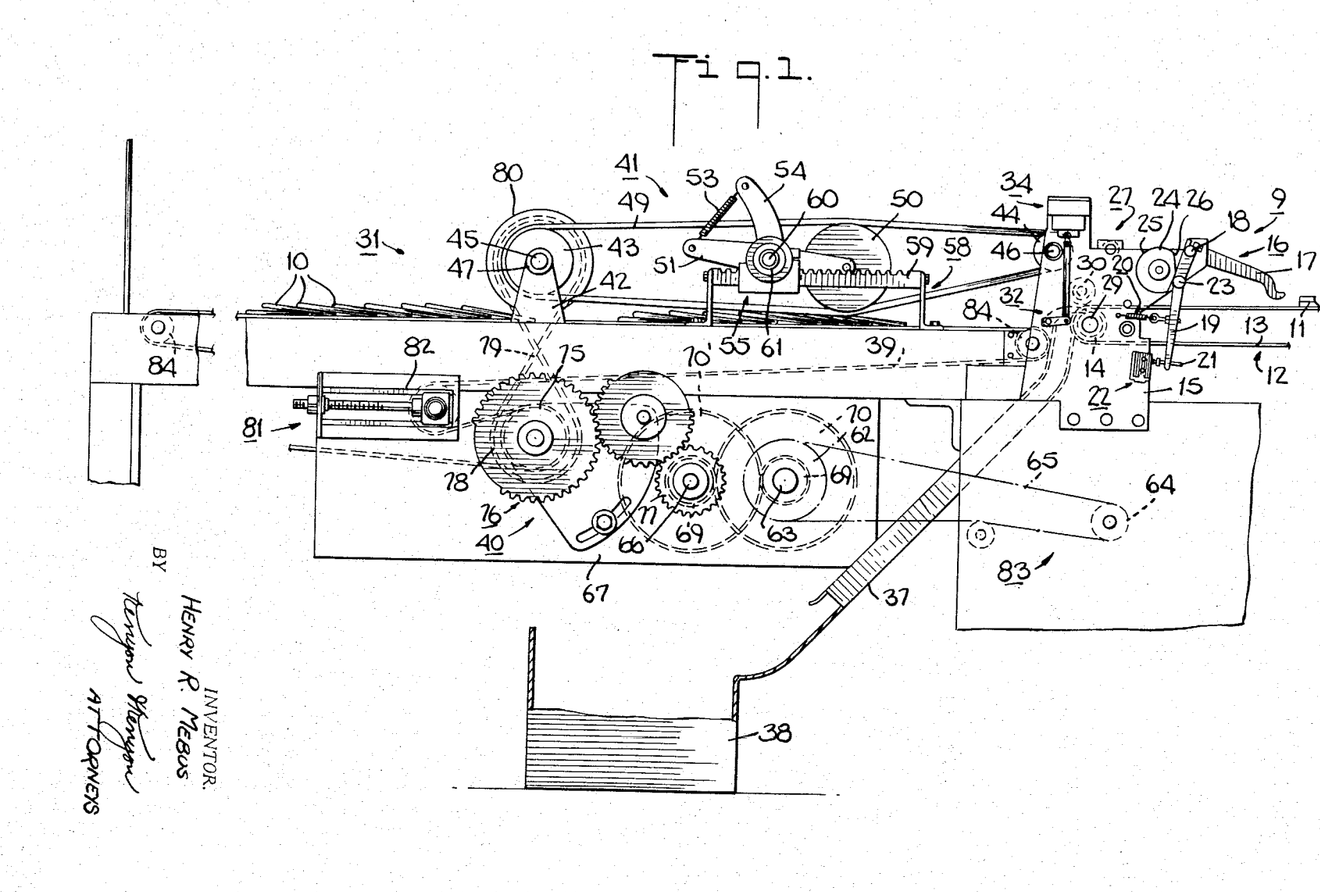
FIG. 1 illustrates a rear portion of a book trimmer assembly embodying the apparatus of this invention.
Figure 2:
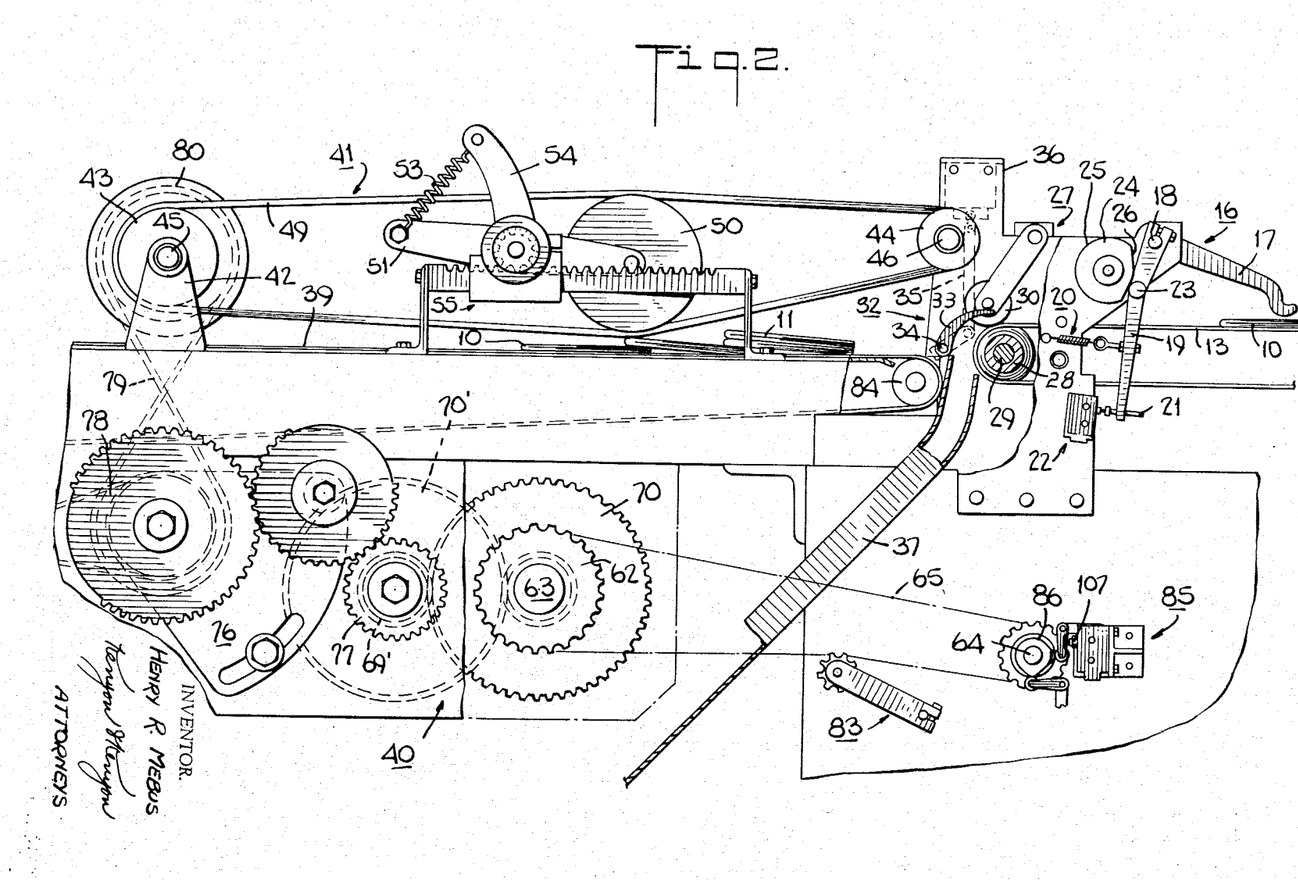
FIG. 2 illustrates an enlarged sectional view of the apparatus of this invention.
Figure 3:
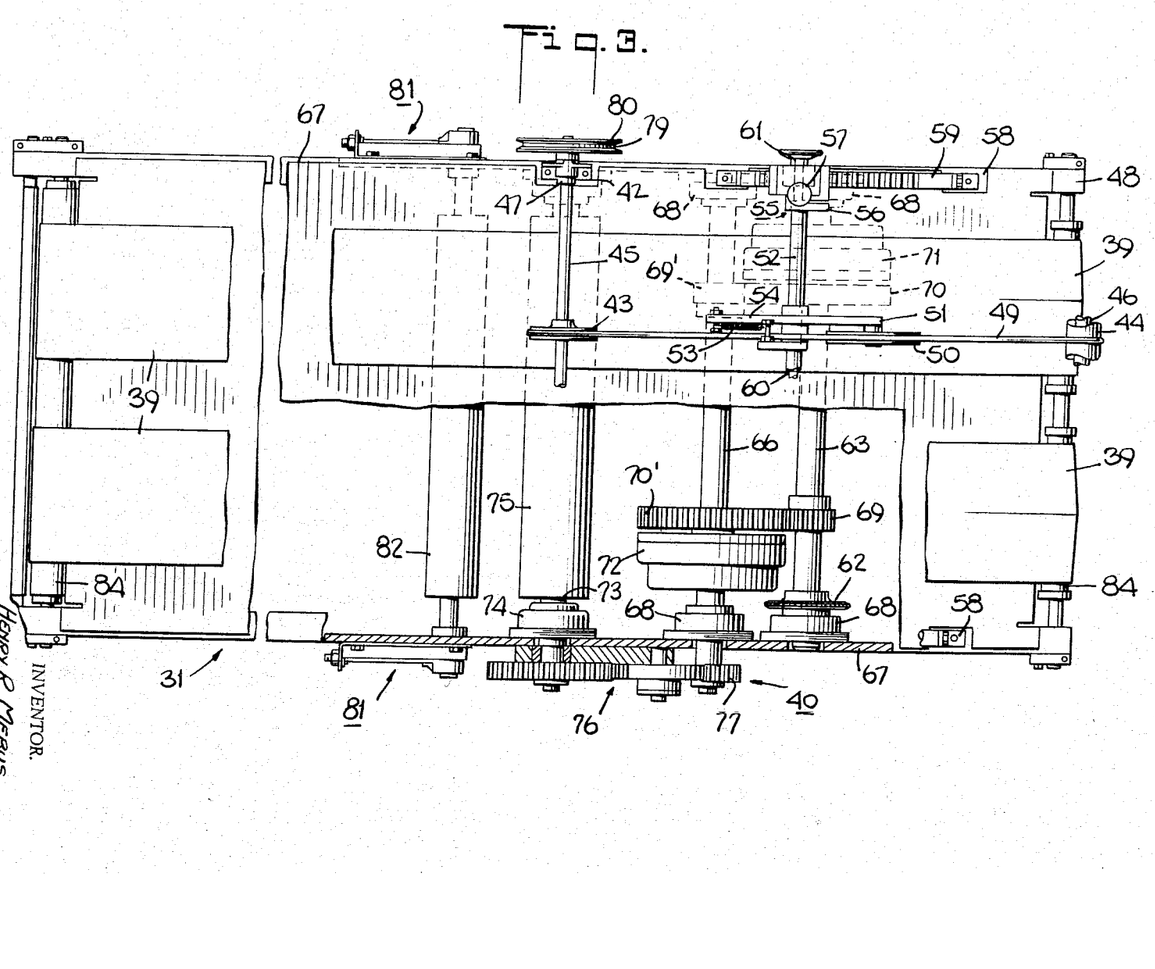
FIG. 3 illustrates a plan view of the conveyor of the book trimmer of FIG. 1.

Referring to FIGS. 1 to 3, the book trimmer assembly 9 is provided with any suitable conventional cutter and trimming assembly (not shown). The cutter and trimming assembly performs cutting and trimming operations on the books 10 which are directed therethrough in a stacked fashion to effect the desired flush edges on the books as is well known and is therefore in need of no further description.

The books 10 are passed from the cutter and trimming assembly in stacked fashion, for example, in stacks 11 of two, onto a suitable conveyor 12 such as, an intermittent traveling chain conveyor, which is composed of a plurality of spaced conveyor chain belts 13. At the downstream end of the conveyor 12 the chain belts 13 pass around a conveyor roll 14 which is suitably journalled in a pair of end frames 15, 15' mounted on either side of the book trimmer 9 which end frames 15 also mount a suitable stack detector 16 therebetween.

For example, the stack detector 16 includes an arm 17 fixedly mounted on a shaft 18 over the conveyor chain belts 13 in the path of the stream of book stacks 12. The shaft 18 is journalled for rotation in the end frames 15, 15' and has a pivot arm 19 secured to one end thereof to the outside of the end frame 15. The pivot arm 19 is spring biased in the direction of the downstream end of the conveyor chain belts 13 by means of any suitable spring assembly 20 and mounts a suitable contact pin 21 in its free end for operational contact with a limit switch 22 mounted on the end frame 15. The pivot arm 19 also has a cam follower 23 mounted at an intermediate point thereof for cooperation with a corresponding cam 24 rotatably mounted on the frame 15. This cam 24 has a cam surface 25 with an indented portion 26 which corresponds to the conveyed pattern of book stacks.

The stacks 11 of books are conveyed along the belts 13 in spaced manner in timed sequence with the cam 24 so that as each stack 12 of books comes under the arm 17 of the stack detector 16, the cam follower 23 is restrained from abutment with the indented surface portion 26 of the cam 24. As a stack of books passes from under the arm 17, the cam follower again comes into abutment with the cam surface portion of the cam 24 to restrain downward movement of the arm 17. However, whenever a stack of books of less number than desired comes under the arm 17 or whenever there is an absence of books in the sequence, the arm 17 pivots downwardly under the urging of the spring assembly 20 so that the cam follower remains in contact with the cam surface of cam 24 and the contact pin 21 of the pivot arm 19 moves into actuating contact with the limit switch 22. The purpose of the limit switch and its operation will be further described hereinafter.

A suitable book stack delivery assembly 27 is mounted in the end frames 15, 15' at the downstream end of the conveyor 12. The delivery assembly 27 includes a roller 28 mounted on the shaft 29 of the conveyor belt pulley between the chain belts 13 for continuous high speed rotation independent of the intermittent drive of the chain belts 13 and a cam lifted roller 30 which is normally in a raised position spaced from the roller 28. When a book stack 11 is positioned at the downstream end of the conveyor 12 the cam lifted roller 30 is actuated to descend into engagement with the positioned book stack to press the book stack between the rollers 28 and 30 so that the rotation of the continuously rotating roller 28 will cause delivery of the book stack from the conveyor 12 onto the take-up conveyor 31 in a fanned fashion. The speed of the delivery assembly 27 is substantially higher than the speed of the conveyor, when operating, so that the book stacks are delivered onto the conveyor at a rapid rate. Further, the cam lifted roller 30 is positioned to engage a book stack at a suitable distance in from the front of the books, for example, a distance of five inches, so that a wide range of book length sizes can be used without changing the position of the roller 30.

A deflector assembly 32 is also mounted in the end frames 15, 15' adjacent the downstream end of the conveyor belts 13. The deflector assembly 32 has a plurality of pivotally mounted arms 33, each of which is mounted on a common shaft 34 between a respective pair of conveyor belts 13. The shaft 34 is connected through a linkage assembly 35 to a solenoid 36 for oscillation in response to actuation of the solenoid 36. The solenoid 36 is actuated by the limit switch 22 upon contact with the pin 21 of the stack detector. Hence, whenever the limit switch 22 is actuated due to the lack of a stack of books of the desired number, the deflector arm 33 will also be actuated. During continued delivery of book stacks of the desired number the deflector arms 33 will repose below the plane of the surface of the conveyor belts; however, when the solenoid 36 is actuated the deflector arms 33 will be raised into the path of the undesired stack of books to cause that book stack to be diverted into a suitable chute 37 for discarding the book stack into a collection hopper 38 disposed below the conveyor 31. After an undesired stack of books has been diverted into the chute 37, the deflector arms 33 will be returned to the repose position below the surface of the conveyor belts 13 as hereinafter described.

After the books 10 are delivered onto the conveyor 31 they are transported in fanned fashion on a suitable pair of endless conveyor belts 39 which are driven through a suitable variable speed transmission 40 under a pair of suitable holddown assemblies 41 mounted by suitable supports 42 on the conveyor 31 and in the end frames 15 of the trimmer. Both holddown assemblies 41 are driven by the transmission 40 in any suitable manner over a respective conveyor belt 39 and each includes a pair of spaced rolls 43, 44 mounted on respective common shafts 45, 46, which are rotatably mounted by suitable bearings 47, 48 in the supports 42. An endless holddown belt 49 which is made of a plastic material with a cylindrical cross-section, for example a ¼ inch diameter nylon belt, passes over the rolls 43, 44 in spaced relation above an endless conveyor belt 39 so as to maintain the fanned position of the books as delivered during accelerated movement of the belts 39, 49. In addition, each holddown assembly 41 includes a horizontally movable pulley 50 positioned intermediately of the rolls 43, 44 for pressing the holddown belt 49 against the group of books thereunder, especially, to grip the top surface of the last book at the front end of the book between the belts 39 and 49 to maintain the relative spacing of the books in the group during acceleration of the belts 39, 49. It is noted that without such a holddown assembly, the last book of each group would backslide from the others during acceleration of the belt 39. Also, the pulley 50 provides for adjustment of the angle of the holddown belt 49 at the forward portion of the holddown assembly 41, so as to permit various lengths of books to be deposited on the belts 39. That is, when a long book is delivered, the pulleys 50 are moved to the left of FIG. 1 and when a short book is delivered, the pulleys 50 are moved to the right of FIG. 1. Each pulley 50 is rotatably mounted on one end of a pivot arm 51 which is suitably journalled on a common fixed tube 52 and spring biased at the other end by a tension spring 53 to an arm 54 fixed on the common tube 52 so as to be resiliently urged downwardly. The tube 52 extends over the conveyor 31 and is fixed in suitable brackets 55 at each side of the conveyor 31.

For purposes of this description, the term book is taken to designate saddle bound books and magazines such as, the conventional weekly news magazines in the present market. Further, in relation to the direction of travel the front or leading edge of the book designates the bound end and the back of the book designates the end from which the book is normally opened; the length of the book is the distance from front to back.

Each of the brackets 55 is provided with a suitable split collar means 56 for receiving the end of a tube 52 in clamping engagement and a suitable bracket locking device, such as, a knob 57. Further, each of the brackets 55 is mounted on an elongated support 58 which is secured on the conveyor 31 and which includes a toothed rack 59 upon which a bracket 55 is cooperatively mounted for horizontal movement into the various positions corresponding to the teeth of the rack 51 so as to cause corresponding movement of the pulleys 50.

A shaft 60 passes through each of the brackets 55 and the hollow tube 52 for horizontal movement of the holddown pulleys 50 in unison. When the pulleys 50 are in desired position, the knob 57 of each bracket is threaded into locking engagement with the shaft 60 to maintain the position of the pulleys 50. In addition, a suitable hand wheel and gear assembly 61 is secured on the end of the shaft 60 in cooperation with the rack 59 for adjusting the position of the brackets 55 along the respective racks 59.

Referring to FIGS. 1 to 4, the transmission 40 of the conveyor 31 is driven through and fixedly mounted sprocket 62 on shaft 63 through a suitable transfer shaft and pinion 64 of the cutter and trimmer assembly and chain belt 65. The transmission includes a pair of shafts 63, 66, each of which is journalled in the end frames 67 of the conveyor 31 by suitable bearings 68 and each of which has a fixed pinion 69 and a freely mounted gear 70 thereon for meshing engagement with an opposed gear 70' and pinion 69', respectively, of the other shaft. The shaft 63 mounts a clutch 71 thereon for engagement with the gear 70 to cause the transmission to operate at a high speed and the shaft 66 mounts a similar clutch 72 thereon for engagement with the corresponding gear 70' to cause the transmission to operate at a normal low speed.

Figure 4:
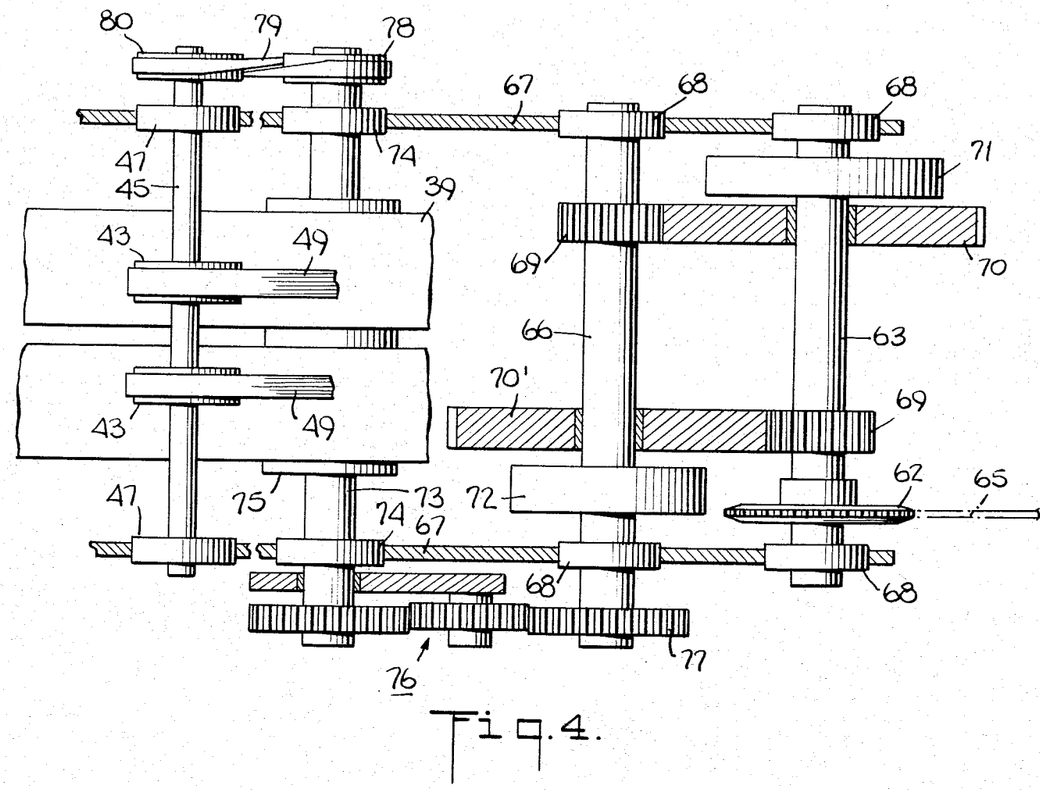
FIG. 4 illustrates a plan view of the transmission drive for the conveyor of FIG. 1.

In operation, only one of the clutches 71, 72 will be in engagement with a respective gear 70, 70' so that upon actuation of alternate clutches, the speed of the transmission 40 can be changed from a low speed to a high speed and vice-versa.

The transmission 40 further includes a conveyor belt drive shaft 73 which is suitably journalled in the end frames 67, as by bearings 74, and which carries a suitable roll 75 over which the delivery belts 39 of the conveyor 31 pass in driving engagement. The drive shaft 73 is provided with suitable gear arrangement 76 at one end in meshing engagement with the gear 77 fixedly mounted on the end of the shaft 66. For example, the gear arrangement 76 may comprise a set of change gears of suitable well known construction which can be changed to vary the speed of the conveyor belts 39. This is desirable where different thicknesses of books are involved since the smaller thickness books require a carefully controlled speed to maintain a desired height of the books as they are conveyed as a group in fanned fashion. It is noted that as the thickness of the individual books increase, the speed of the conveyor belts 39 becomes less critical in relation to the height of the fanned group of books. The drive shaft 73 is also provided with a pulley 78 at its other end which drives a suitable belt 79 which in turn drives the drive shaft 45 of the holddown assemblies 41 through a cooperating pulleys 80 fixedly mounted on the end of the drive shaft 45.

The transmission 40 further includes a suitable take-up roll assembly 81 of conventional design which includes a roll 82 around which passes the conveyor belts 39 and which need not be further described. Likewise, a chain belt take-up 83 (FIG. 2) is provided to take-up the chain belt 65.

As shown in FIGS. 1 and 3, the conveyor belts 39 which are made of any suitable material, such as a two-ply canvas material, pass over suitable rolls 84 journalled in the frames of the conveyor 31 at each end thereof.

Referring to FIG. 2, the cutter and trimmer assembly has a suitable counter mechanism 85 mounted thereon adjacent the transfer shaft 64 which cooperates with a cam 86 fixedly mounted on the shaft 64 for counting the cycles of the trimmer which correspond to the stacks of books being trimmed and conveyed to the conveyor 31.

In operation, the cutting and trimmer assembly delivers a series of book stacks onto the conveyor belts 13 in synchronism with the operation of the stack detector 16 so that as each book stack passes under the stack detector 16, the cam follower 23 separates from contact with the cam 24 causing the spring assembly 20 to urge the arm 17 downwardly into contact with the top surface of the book stack.

When the desired number of books are in the stack under the stack detector arm 17, the arms 33 of the deflector assembly 32 remain below the plane of the belts 13 so that the detected book stack is conveyed to a position between the holddown delivery rolls 28, 30 for delivery onto the belts 39 of the conveyor 31 and the books are spread out into a fanned fashion and come under the holddown assemblies 41.

At the same time, the counter mechanism 85 counts the book stacks up to a predetermined number. After the counter mechanism 85 has counted a predetermined number of book stacks, it actuates the transmission 40 so that the speed of the conveyor belts 39 is increased causing the books on the belts 39 to move forwardly with the belts at a faster rate. The holddown assemblies, meanwhile, also are sped up so that the books between the holddown assembly belts 49 and conveyor belts 39 maintain their respective positions therebetween notwithstanding the forces of acceleration. Thereafter, as the following stack of detected books is counted and deposited onto the delivery belts, the transmission 40 is returned to its lower speed. Thus, a spacing is provided between the last book of a group of a predetermined number of books and the first book of the following group of books.

Wherever a stack of books which does not contain the desired number of books comes under the arm 17 of the stack detector the spring assembly will not only urge the arm 17 into a lower position but also will bring the contact pin 21 of the pivot arm 19 into actuating contact with the limit switch 22. The limit switch will then actuate the solenoid 36 of the deflector assembly 32 causing the arms 33 to raise into the path of travel of the undesired stack of books so that the stack will be diverted into the chute 37 and delivered into the collection hopper 38. At the same time, the limit switch 22 not only causes the counter mechanism 85 to become inoperative so as to avoid counting the undesired stack of books but also causes disengagement of the transmission 40 clutches from the respective gears causing the conveyor belts 39 and holddown belts 49 to stop. After the undesired stack of books reaches the reject position at the deflector assembly 32, the cam 24 will bring the contact pin 21 of the pivot arm 19 out of contact with the limit switch 22, the counter mechanism will be reactivated and the conveyor belts 39 and holddown belts 49 will resume movement. Thus, whenever there is a need to reject a stack of books, the operation of the apparatus will not be affected insofar as the spacing of the desired number of books on the conveyor 31 is concerned.

Figure 5:
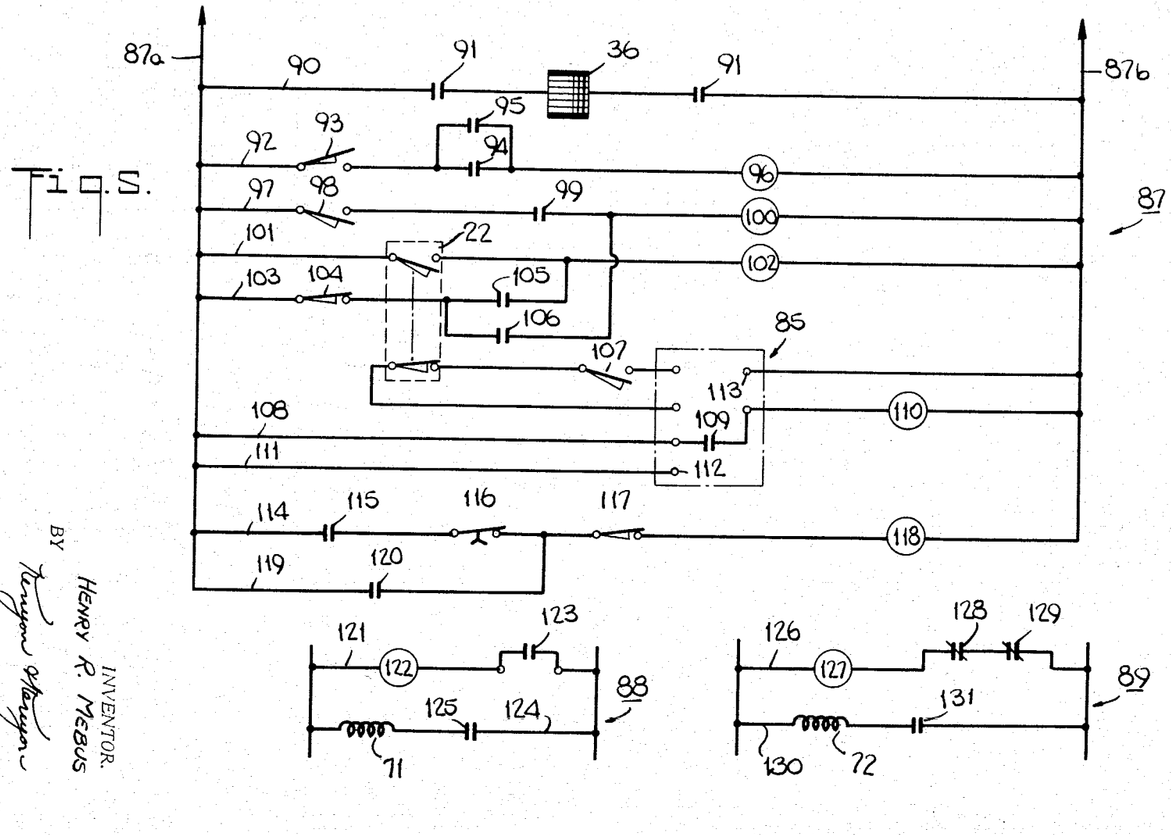
FIG. 5 illustrates a schematic diagram of an electrical circuit utilized in the operation of the book tirmmer of FIG. 1.

Referring to FIG. 5, the operation of the apparatus can be controlled by an electrical circuit 87 control signal power being supplied through lines 87a and 87b. The clutches 71, 72 are electrically powered through the circuit 88, 89. For example, a circuit 90 is provided through contacts 91, 91' to energize deflector solenoid 36; a circuit 92 is provided through a cam operated limit switch 93 and contacts 94, 95 and relay 96; a circuit 97 is provided through the cam operated limit switch 98, contact 99 and relay 100; a circuit 101 is provided through limit switch 22 and relay 102 while a circuit 103 is provided through limit switch 104 and contacts 105, 106 and relays 102, 100, respectively. Additionally, the circuit 101 is provided through the limit switch 22 and limit switch 107 of the counter mechanism 85. Also, a circuit 108 is provided through an internal switch 109 of the counter mechanism 85 and a time relay 110; a power circuit 111 is provided between terminals 112 and 113 of the counter mechanism 85; a circuit 114 is provided through the contact 115, time delay switch 116, cam operated switch 117 and relay 118; and a circuit 119 is provided through contact 120, cam operated switch 117 and relay 118.

The clutch circuit 88 has a circuit 121 provided through a relay 122 and contact 123, and a circuit 124 through clutch 71 and contact 125. The other clutch circuit 89 has a circuit 126 provided through a relay 127 and contacts 128, 129 and a circuit 130 provided through clutch 72 and contact 131.

When the apparatus is in normal operation, the counter mechanism 85 will count off the number of book stacks detected and the clutch 72 will be energized through suitable contact 128 and 129 which are normally closed and which energize control relay 127 and relay contact 131. As the counter mechanism 85 reaches the end of its counting cycle, an internal switch 109 therein, which is normally open, is closed so as to energize a time relay 110. This causes the instantaneous contact 115 which is normally open to close and energize the relay 118. Thereafter, the holding contact 123 of the clutch circuit 88 which is normally open closes to energize the relay 122 and close the normally open contact 125 so as to energize the high speed clutch 71. At the same time, the contact 128 of the clutch circuit 89 which is normally closed opens to deenergize the low speed clutch 72. After a time delay, the time delay switch 116 opens so that the cam operated switch 117 directly controls the length of time the transmission 40 will run at high speed. It is noted that the switch 117 is in timed relationship with the rate of delivery of the trimmed book stacks from the cutting and trimming assembly.

Whenever a stack of books of less number than desired is detected, the limit switch 22 is actuated so as to deactivate the counter mechanism 85. At the same time, the relay 102 is energized to close the normally open holding contacts 99, 105 of circuits 97, 103.

As the undesired stack of books reaches the reject station adjacent the deflector assembly 32, the cam operated limit switch 98 which is normally opened closes to energize the relay 100 and close the normally open contact 106 of the circuit 103, as well as the normally open contacts 91, 91' in the circuit 90 of the deflector solenoid 36. The energized solenoid 36 will then cause the arms 33 to be raised into the path of travel of the undesired stack of books. Also, the normally open contact 94 closes to energize the relay 96 of the circuit 92 through the normally closed cam operated limit switch 93 to close the normally open contact 95 which causes the normally closed contact 129 of the low speed clutch circuit 89 to open thereby stopping the delivery of power to the transmission 40 and effecting a shutdown of the conveyor belts 39.

After the undesired stack of books passes the reject position and is diverted into the chute 37, the normally closed cam operated switch 104 of the circuit 103 opens to reset the circuit 87 for the next cycle while the arms 33 return to normal position below the plane of the belts 13.

As a stack of books of the desired number comes under the detector arm 17 following a reject, the cam operated switch 93 which is normally closed opens to cause the slow speed clutch circuit 89 to be energized to effect the delivery of power to the transission 40 for normal operation.

It is noted that the cam operated switches 98, 93 and 104 can be mounted on a common shaft and that they are in timed relation with the delivery of trimmed book stacks from the cutting and trimming assembly.

Figure 6:
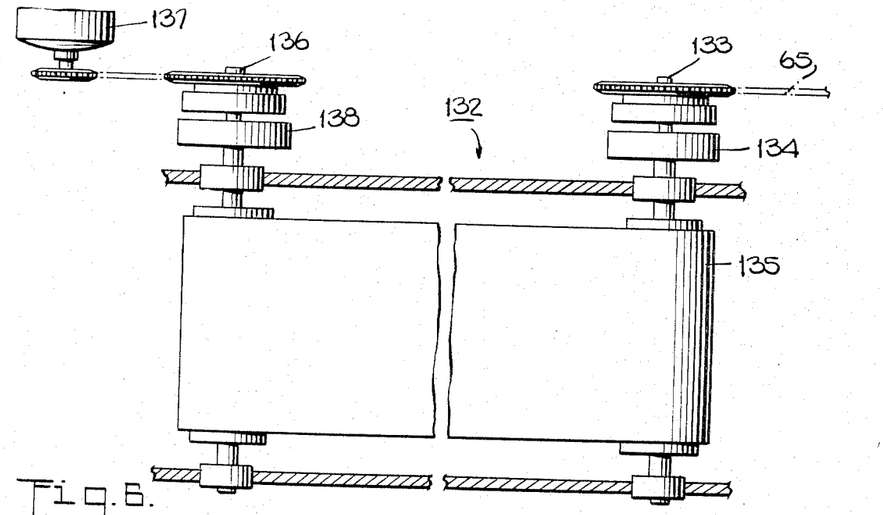
FIG. 6 illustrates a modification of the transmission drive of FIG. 4.

Referring to FIG. 6, a modified transmission 132 may be used as an alternative to the above transmission 40. The modified transmission 132 includes a shaft 133 driven off the trimmer drive at a slow speed, an electric clutch 134 mounted on the drive shaft 133 for driving the conveyor belt 135 at normal speed, a shaft 136 driven off a continuously running motor 137 for high speed belt drive, and an electric clutch 138 mounted on the shaft 136 for driving the conveyor belt 135 at a higher speed than normal.

In operation, the clutch 134 is energized for normal running of the conveyor belt 135 and is opened in the event of a missing book or books in a book stack. The clutch 138 is energized for high speed running of the conveyor belt 135 to effect a spacing between groups of books.

Figure 7:
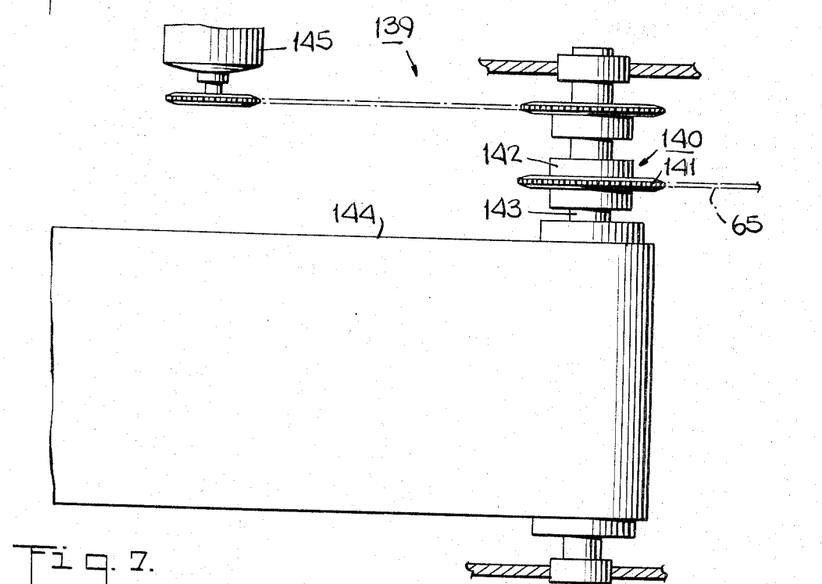
FIG. 7 illustrates another modification of the transmission drive of FIG. 4.

Referring finally to FIG. 7, another modified transmission 139 may be used. This transmission 139 includes a normal speed drive 140 having a sprocket 141 mounted on an overrunning clutch 142 driven off the trimmer drive, a drive shaft 143 driven through the clutch 142 for driving the conveyor belt 144, a motor 145 operably connected to the drive shaft 143 for driving the shaft 143 and belt 144 at a higher speed than normal to effect a book spacing. In this modification, the motor 145 is energized by the counter mechanism of the apparatus to make a space between counts.

The apparatus as described above is operated in synchronism with the speed of delivery of the book stacks from the cutting and trimming assembly. As an example of such, where the intermittent traveling conveyor 12 operates at 100 cycles per minutes, a delivery roll 28 of 3⅝ inch diameter operates between a minimum speed of 200 r.p.m. of a maximum speed of 800 r.p.m.; the usual speed being about 350 r.p.m. to give a reach of about 40 inches per cycle. Also, the speed of the rolls 84 of the take-up conveyor are set at a slower speed than the speed of the book trimmer and delivery rolls to obtain the fanned effect. For example, the rolls 84 can be set at a speed in the range from ½ inch to 2 inches per cycle.

Further, the apparatus is intended to space out books of a thickness up to ⅝ inch, with the usual thickness being ¼ inch. It is noted, however, that books of greater thicknesses can be utilized where the trimmer can accommodate the increased thicknesses.

Once the groups of books have been spaced on the belts 39, each group is scooped up manually with two hands to a suitable boxing station.

It is to be noted that the transmission 40 has been described as variable with respect to the drive of the book trimmer being made variable in similar manner to achieve the spacing of the books on the take-up conveyor.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An apparatus for automatically grouping and spacing books delivered from a trimmer assembly comprising trimmer conveyor means for transporting a series of trimmed book stacks, take-up conveyor means positioned adjacent the downstream end of said trimmer conveyor means for receiving stacks of books in fanned fashion from said trimmer conveyor means, transmission means for driving said trimmer conveyor means and said take-up conveyor means at different variable speeds relative to each other for effecting a spacing between successive groups of books delivered onto said take-up conveyor means, at least one holddown assembly mounted on said take-up conveyor means for maintaining the fanned position of the books delivered onto said take-up conveyor means during operation of said take-up conveyor means, said holddown assembly being operably connected to said transmission for simultaneous operation therewith, said holddown assembly including a pair of spaced rolls, one of said rolls being spaced above the plane of said trimmer conveyor means, an endless holddown belt enveloping said pair of spaced rolls, and a horizontally movable pulley positioned intermediately of said rolls in resilient engagement with said holddown belt whereby the angle formed by said holddown belt between said one roll and said pulley can be varied in relation to the length of the books received on said delivery conveyor means upon horizontal movement of said pulley and the last book of each group of books can be pinched between said holddown belt and said take-up conveyor means during acceleration of said take-up conveyor means to avoid relative movement between the last book and said take-up conveyor means.

2. An apparatus as set forth in claim 1 wherein said holddown belt is a plastic belt of circular cross-section.

3. An apparatus as set forth in claim 1 which further comprises a stack detector means positioned over said trimmer conveyor means for detecting the number of books in successively transported book stacks and deflector means positioned at the downstream end of said trimmer conveyor means, said deflector means having piovtal arm means for movement into the path of travel of the transported book stacks to divert a stack of books under said arm means.

4. An apparatus as set forth in claim 3 wherein said stack detector means includes a pivotally mounted arm positioned over said trimmer conveyor means for engagement with the top surface of a transported book stack, spring means for urging said arm towards said trimmer conveyor means and cam means for retaining said arm out of engagement with said trimmer conveyor means, said cam means having an indented cam surface portion which corresponds to a desired height of book stacks on said trimmer conveyor means.

5. An apparatus as set forth in claim 4 which further comprises a switch means operably connected between said stack deflector means and said transmission means for de-energizing said transmission means in response to said arm of said stack detector detecting book stack of less height than desired.

6. An apparatus as set forth in claim 3 which further comprises a chute positioned at one end under said pivotal arm means and a collection hopper positioned at the other end of said chute for receiving a stack of books diverted under said arm means.

7. An apparatus as set forth in claim 3 which further comprises a delivery roll assembly positioned at said downstream end of said trimmer conveyor means for delivering the stacks of books to said delivery conveyor means in fanned fashion.

8. An apparatus as set forth in claim 3 wherein said trimmer conveyor is an intermittent traveling conveyor for conveying the trimmed book stacks in intermittent manner and wherein said stack detector is in synchronism with said intermittent traveling conveyor.

9. An apparatus as set forth in claim 3 which further comprises a counter mechanism operably connected to said stack detector means for counting successive stacks of books of a desired number and an actuating means operably connected to said counter means and said transmission means for driving said transmission means at an intermittent higher speed than normal in response to a predetermined count of book stacks whereby the spacing between successive groups of books is effected on said delivery conveyor means.

10. An apparatus for automatically grouping and spacing books delivered from a trimmer assembly comprising trimmer conveyor means for transporting a series of trimmed book stacks, take-up conveyor means positioned adjacent the downstream end of said trimmer conveyor means for receiving stacks of books in fanned fashion from said trimmer conveyor means, transmission means for driving said trimmer conveyor means and said take-up conveyor means at different variable speeds relative to each other for effecting a spacing between successive groups of books delivered onto said take-up conveyor means, a stack detector means positioned over said conveyor means for detecting the number of books in successively transported book stacks and deflector means positioned at the downstream end of said trimmer conveyor means, said deflector means having pivotal arm means for movement into the path of travel of the transported book stacks to divert a stack of books under said arm means, a counter mechanism operably connected to said stack detector means for counting successive stacks of books of a desired number and an actuating means operably connected to said counter mechanism and said transmission means for driving said transmission means at an intermittent higher speed than normal in response to a predetermined count of book stacks whereby the spacing between successive groups of books is effected on said take-up conveyor means and switch means for deactivating said counter mechanism upon movement of a stack of books of undesired number under said stack detector, means for de-energizing said transmission means to shut down said take-up conveyor means and means for deactivating said deflector means to pivot said arm means into said path of travel of said stack of books of undesired number whereby said delivery conveyor means is stopped during discarding of a stack of books of undesired number and said counter mechanism is deactivated so as not to effect the count of book stacks delivered to said take-up conveyor means.

11. An apparatus as set forth in claim 10 wherein said transmission means is driven off the drive of said trimmer conveyor means.

References Cited

UNITED STATES PATENTS

| Re. 20,541 | 10/1937 | Staude. | |
| 1,448,716 | 3/1923 | Pool | 209—88 |
| 1,787,254 | 12/1930 | Kirman et al. | 198—76 X |
| 2,225,005 | 12/1940 | Gudger | 209—88 |
| 2,713,430 | 7/1955 | Verrinder | 198—35 X |
| 2,890,884 | 6/1959 | Mestre. | |
| 3,145,828 | 8/1964 | Hawley | 198—34 |

FOREIGN PATENTS

| 969,274 | 9/1964 | Great Britain. |

EVON C. BLUNK, *Primary Examiner.*

M. L. AJEMAN, *Assistant Examiner.*